US011051517B2

(12) United States Patent
Zanoni et al.

(10) Patent No.: US 11,051,517 B2
(45) Date of Patent: Jul. 6, 2021

(54) ENZYME-FUNCTIONALISED NANOBEADS FOR ANTI-BIOFOULING PURPOSES

(71) Applicant: University College Dublin, National University of Ireland, Dublin, Dublin (IE)

(72) Inventors: Michele Zanoni, Masi (PD) (IT); Jessica Amadio, Dublin (IE); Eoin Casey, Dublin (IE); Olivier Habimana, Dublin (IE)

(73) Assignee: University College Dublin, National University of Ireland, Dublin, Dublin (IE)

( * ) Notice: Subject to any disclaimer, the term of this patent is extended or adjusted under 35 U.S.C. 154(b) by 223 days.

(21) Appl. No.: 15/761,359

(22) PCT Filed: Sep. 16, 2016

(86) PCT No.: PCT/EP2016/071946
§ 371 (c)(1),
(2) Date: Mar. 19, 2018

(87) PCT Pub. No.: WO2017/046313
PCT Pub. Date: Mar. 23, 2017

(65) Prior Publication Data
US 2018/0343872 A1 Dec. 6, 2018

(30) Foreign Application Priority Data

Sep. 17, 2015 (EP) .................................... 15185598

(51) Int. Cl.
| A01N 63/10 | (2020.01) |
| C11D 3/12 | (2006.01) |
| C11D 3/386 | (2006.01) |
| C11D 3/48 | (2006.01) |
| C11D 17/00 | (2006.01) |
| A01N 37/46 | (2006.01) |
| A01N 25/26 | (2006.01) |

(52) U.S. Cl.
CPC ............ *A01N 63/10* (2020.01); *A01N 25/26* (2013.01); *A01N 37/46* (2013.01); *C11D 3/124* (2013.01); *C11D 3/38681* (2013.01); *C11D 3/48* (2013.01); *C11D 17/0039* (2013.01); *C12Y 304/21064* (2013.01)

(58) Field of Classification Search
None
See application file for complete search history.

(56) References Cited

U.S. PATENT DOCUMENTS

2009/0159533 A1  6/2009  Lee et al.
2011/0098453 A1  4/2011  Hyeon et al.

FOREIGN PATENT DOCUMENTS

WO    WO-2016/084036 A1    6/2016

OTHER PUBLICATIONS

Qhobosheane et al. (Analyst, 126: 1274-1278,2001).*
Nguyen et al. (International Journal of Food Microbiology, 187: 26-32, 2014).*
Qhobosheane et al. "Biochemically Functionalized Silica Nanoparticles", Analyst, London, GB, vol. 126, Aug. 1, 2001, pp. 1274-1278.
Bai et al. "Gold Nanoparticles-Mesoporous Silica Composite Used As an Enzyme Immobilization Matrix for Amperometric Glucose Biosensor Construction", Sensors and Actuators B: Chemical: International Journal Devoted to Research and Development of Physical and Chemical Transducers, vol. 124, Issue 1, June 10, 2007, p. 179-186.
Database WPI, Section Ch, Week 201366, Thomson Scientific, London, GB; Class B04, AN 2013-H37384, XP-002755380.
Database WPI, Section Ch, Week 201428, Thomson Scientific, London, GB; Class A14, AN 2013-V14490, XP-002755379.

* cited by examiner

*Primary Examiner* — Nelson B Moseley, II
(74) *Attorney, Agent, or Firm* — Cesari & McKenna, LLP

(57) ABSTRACT

A composition comprising a silica-based nanobead having its surface functionalized by a moiety selected from moieties that are reactive to and combine with a fouling layer on a material surface.

15 Claims, 6 Drawing Sheets

ID NANOBEADS
ENZYME-FUNCTIONALISED NANOBEADS FOR ANTI-BIOFOULING PURPOSES

CROSS REFERENCE TO RELATED APPLICATIONS

This application is the National Stage of International Application No. PCT/EP2016/071946, filed on Sep. 16, 2016, which claims priority to European Application No. EP15185598.8, filed on Sep. 17, 2015. The contents of both applications are hereby incorporated herein by reference in their entirety:

FIELD OF THE INVENTION

The invention relates to enzyme-functionalised nanobeads for anti-biofouling purposes and methods. In more detail, the invention relates to enzyme-functionalised silicone nanobeads for anti-biofouling and methods thereof.

BACKGROUND TO THE INVENTION

Biofouling is a significant operational problem in the oil, food and pharmaceutical industries and medical devices. Adhesion of bacteria to surfaces and subsequent proliferation and extracellular polymeric substance (EPS) production lead to the formation of surface-associated bacterial communities called biofilms. Biofilms are central to biofouling of industrial processing equipment, with increased operational costs. Some specific examples of the negative consequences biofouling include:

1. Inhibition of heat transfer in heat exchangers;
2. Increased pressure drop in water circuits, due to biofilm-fouled piping. Increasing pumping energy requirements, thus increasing overall energy consumption, usually circumvents this problem, but if the pumping energy uses electrical power derived from combustion process, the CO2 emissions would likewise increase, contrary to the UN Framework Convention on Climate Change (UNFCCC, 2012); and
3. Surface corrosion of process equipment by sulphate-reducing bacteria, other known as bio corrosion.

Biofilms are ubiquitous in nature, adaptable through environmental variations, and are highly resistant to antimicrobial agents, thus are formidable opponents against currently employed industrial sanitisation treatments. Various hygienic strategies are shown to be used for cleaning and disinfection of surfaces against biofouling. Aggressive chemicals such as hypochlorite are often applied, but they have the disadvantage of corroding materials, machinery, endangering users and negatively impacting the environment. "Greener" alternatives are emerging as viable options to combat the problem of industrial biofilms. These "green-chemicals" include enzymes. Enzymatic based technologies are effective in removing biofouling, however the expense has made them prohibitive. Furthermore, these technologies usually work in synergy with cleaning agents, and for the most part are composed of a two-step treatment method. The first step involves disrupting the different components of biofilm EPS through the enzymatic action, followed by a biocidal treatment using an antimicrobial agent against the newly exposed/detached bacteria. This method is applied within Cleaning in Place (CIP) routines, without any mechanical cleaning action of in situ pipes and other processing equipment between production runs. Although effective and promising, these enzyme-based technologies are limited to a one-time use basis only, and the enzymes are discarded after use, increasing the financial burden on the industry.

The considerable cost of biofouling contamination, on both small and medium sized industries, results in a lucrative market for biofouling control technologies. Industrial biofouling incidents slow down operator production time, increasing operating costs, energy consumption and reducing product output. It is difficult to quantify the financial implications of the various types of biofouling, but estimates have been made in some key industries. Biofouling in desalination facilities are estimated to cost €12 billion per annum; biofouling on crude oil distillation alone is estimated to cost €3.5 billion per annum worldwide; in aquaculture an effective solution would result in savings of €130-260 million per annum, 5-10% of market value, and in one case study the cost of biofouling in a single water treatment works was estimated at €600,000 per annum.

In US Patent Publication No. 2009/159533, the document discusses the use of a magnetic carrier functionalised with enzymes for use in preventing bio-fouling resulting in the growth of biofilms. The document discusses reusing the functionalised magnetic carrier by separating and collecting for recycling by using a magnet so as to reuse the carrier in the next operation. WO 2009/062518 discloses an anti-fouling composition comprising one or more aerogels, which encapsulate one or more bioactive agents. The agents, which may comprise enzymes, can be released from the aerogel over time. The aerogel may be made from silicates.

There are many types of magnetic nanobeads, such as those mentioned in prior art document US Patent Publication No. 2009/159533 and, as such, they have a wide variety of properties. The use of chitosan, 3-aminopropyltriethoxsilane, polyethyleneimine, poly(2-hydroxyethyl metacrylate (PHEMA), cellulose, agarose, and dextran as material for the layer on which enzyme immobilisation occurs, are not noted for their high density relative to water.

Y U Bai et al. (Sensors and Actuators B: Chemical: International Journal Devoted to Research and Development of Physical and Chemical Transducers, vol. 124(1), pp. 179-186 (2007)) describes silica-based nanobeads having its surface functionalised by an active enzyme. US 2011/0098453 describes magnetic silica nanoparticles functionalised with a protein. KR20130046205 describes an enzyme-fixed gold-magnetic silica nanoparticle containing a plurality of —SH groups, one or more gold nanoparticles, and one or more enzymes. KR 20130124194 describes a paint composition effective against biofouling comprising silica nanoparticles having its surface functionalised by an enzyme.

It is an object of the invention to overcome at least one of the above-mentioned problems.

SUMMARY OF THE INVENTION

This invention relates to the development of reusable enzyme-functionalized nano-beads as anti-fouling agents. Specifically it relates to the problem of biofouling, which is caused by the formation of biofilms (fouling layers) in aqueous environments of relevance to the process and healthcare industries. The nanobeads surface will be functionalised with active enzymes (i.e. proteases, polysaccharidases, DNAases). The nanobeads with antifouling properties are suspended in the water, which is in contact with the biofilm. The antifouling property will be optimized with respect to bead size, shape and type, as well as type of enzymes. One of the important aspects of this invention is the ability to recover the beads after their contact with the material (biofouled) surface. The beads recovery system tested is quick and accessible: after the reaction, the solution containing the functionalised beads and the remaining biofilm is filtered in filters of different porosity in order to extract and re-uptake the beads from the floating film. This enables their reuse thereby dramatically changing the economics of enzymatic solutions to biofouling control.

According to the invention, there is provided, as set out in the appended claims, a composition comprising a silica-based nanobead having its surface functionalized by a moiety selected from moieties that are reactive to and combine with a fouling layer present on a material surface.

In one embodiment, there is provided, as set out in the appended claims, a composition for use in treating a fouling layer present on a material surface, the composition comprising a surface-functionalised, silica-based nanobead.

In one embodiment, the silica-based nanobead is recyclable.

In one embodiment, the silica-based nanobead has an active enzyme coating with a specific reactivity to the fouling layer. For example, if the fouling layer was comprised of peptides or proteins, the enzyme coating would be a protease, which is suitable for breaking down peptides and proteins into their constituent parts.

In one embodiment, the silica-based nanobead is selected from the group comprising silica-based nanobeads having different active or inactive enzyme coatings, having varying sizes (diameters), and/or having different reactivity to the fouling layer. The nanobeads may be functionalised by the attachment of luminescent groups, paramagnetic units or bioactive molecules, poly-acrylates, metals, such as, for example, Au, Ag, Cd, Fe, Ferro-magnetic, and the like. The silica-based nanobeads can be chemically altered through the use of different organo-alkoxysilicates precursors (i.e. tetraethyl orthosilicate, tetramethyl orthosilicate), which can also be synthesised by different methods, such as, but not limited to, the Stoeber, reverse microemulsion, direct micelle assisted methods, which are well-known to those skilled in the art. Furthermore, their physical configuration (i.e. spherical, cylindrical, or porous) can also be modified significantly by changing the preparation conditions of the reaction site (i.e. pH, concentration of surfactant and concentration of starting reagents).

In one embodiment, the silica-based nanobead is comprised of silicon, and an organic-based linker composed by carbon, oxygen and nitrogen. Preferably, the silica-based nanobead consists of silicon, carbon, oxygen and nitrogen. Suitably, the silica-based nanobead is spherical or substantially spherical.

In one embodiment, the moiety is selected from the group consisting of active enzymes (such as those that can be used as antifouling agents, such as proteases selected from pro-teinase-K, pepsin, trypsin and papain; oxidoreductases selected from peroxidases, alcohol oxidoreductases, aldehyde oxidoreductases and monooxygenases; lipases selected from bile salt-dependent lipase, phospholipase A and C; polysaccharidase (carbohydrase) and DNAses (like nuclease), iron-based magnetic core, carbonyl groups (such as carboxylic acids and succinic anhydride that can provide the mechanical properties of the nanobead), amines (such as N-(3-dimethylaminopropyl)-N'-ethylcarboxidiimide hydrochloride, which is able to interact mechanically with the target), charged polymers (such as imidazolium and styrene sulphonated based poly-ionic liquids) where their intrinsic biocidal activity that can be positively exploited against the fouling layer (biofilm), and antioxidants such as zinc dialkyldithiophosphates.

Preferably, the active enzymes are selected from proteases, DNAses, polysaccharidase, lipases, oxidoreductases and peroxidases. Suitably, the moiety is a protease selected from Proteinase K, papain, pepsin and trypsin. Ideally, the protease is Proteinase K.

In one embodiment, the silica-based nanobead is further functionalized with a second moiety selected from the group comprising active enzymes (for example, oxidoreductases, lipases, polysaccharidase and DNAses), iron-based magnetic core, carboxyl groups, amines, charged polymers (such as poly-ionic liquids), and antioxidants such as zinc dialkyldithiophosphates.

Preferably, the second moiety is a protease selected from Proteinase K, papain, pepsin, trypsin; an oxidoreductase selected from peroxidases, alcohol oxidoreductases, aldehyde oxidoreductases and monooxygenases; a lipase selected from bile salt-dependent lipase, phospholipase A and C; a polysaccharidase carbohydrase and a DNAse (like nucleases). Ideally, the second moiety is selected from a protease or an oxidoreductase. Preferably, the protease is Proteinase K and the oxidoreductase is a peroxidase. Suitably, the second moiety is Proteinase K.

In one embodiment, the composition is water-dispersible.

In one embodiment, the fouling layer is selected from a biofilm fouling layer, a non-biological organic fouling layer, and a colloidal fouling layer.

In one embodiment of the invention there is also provided a method for removing a fouling layer present on a material surface, the method comprising the steps of:

adding a sufficient quantity of the silica-based nanobead composition as described above to the material surface;

incubating the silica-based nanobead composition and fouling layer on the material surface for a sufficient period of time for the composition and fouling layer present on the material surface to interact for treatment; and separating and removing the silica-based nanobead composition from the treated fouling layer on the material surface following the incubation step.

In one embodiment, the separation step is selected from filtration, centrifugation, electrostatic separation and gravimetric precipitation.

Preferably, the separation step is by filtration. For example, by using an ultrafiltration membrane.

Preferably, the incubation step may be performed for between 2 hours to 72 hours, for between 2 hours to 48 hours, preferably for 2 hours to 36 hours, more preferably for 2 hours to 24 hours, or ideally 2, 3, 4, 5, 6, 7, 8, 9, 10, 11, 12, 13, 14, 15, 16, 17, 18, 19, 20, 21, 22, 23 or 24 hours.

In one embodiment, the silica-based nanobead composition is recycled following the separation step for use in the addition and incubation steps.

Preferably, the recycled silica-based nanobead composition is reintroduced to the addition step.

In one embodiment, the incubation step is performed for between 2 hours to 72 hours.

In one embodiment, the fouling layer is selected from a biofilm fouling layer, an organic fouling layer, and a colloidal fouling layer.

There is also provided a kit for removing a fouling layer from a material surface, the kit comprising a composition as described above.

Preferably, the fouling layer is selected from a biofilm fouling layer, an organic fouling layer, and a colloidal fouling layer. Suitably, the fouling layer is a biofilm fouling layer.

The trials performed to-date use a silica-based platform suitable to multiple functionalisations and able to host a high variety of active units, such as peptides or enzymes or chemically active groups. The examples provided herein have focussed in particular on enzyme functionalised silica nanobeads (Si-NanoB). Their activity consists in the enzymatic digestion and mechanical removal of the protein and other components of the target biofilm.

In the specification, the term "silica-based" should be understood to mean nanobeads comprised primarily of silicon, with possible other components such as carbon, nitrogen, oxygen and sulphur. The nanobead can also be composed solely of silicon.

In the specification, the term "nanobeads" should be understood to mean beads between 40 and 950 nanometres in size.

In the specification, the term "functionalized" should be understood to mean a variety of active units, such as peptides or enzymes or chemically active groups, adhered to a support frame. In this instance, the support frame is a silica-based nanobead.

In the specification, the term "fouling layer" should be understood to encompass a variety of fouling layers, such as biofilm fouling layer, an organic fouling layer, and a colloidal fouling layer.

In the specification, the term "biofilm fouling layer" should be understood to mean a multidimensional microecosystem composed of aggregated microorganisms attached on either a biotic or abiotic surface and immobilized by a self-produced matrix of extracellular polymeric substance.

In the specification, the term "organic fouling layer" should be understood to mean the deposition and accumulation of natural organic matter (NOM) composed by a variety of organic moieties on either a biotic or abiotic surface.

In the specification, the term "colloidal fouling layer" should be understood to mean the deposition of colloids onto biotic or abiotic surfaces, where colloids should be understood to mean a homogeneous non-crystalline substance consisting of large molecules or ultramicroscopic particles dispersed through a second substance.

In the specification, the term "material surface" should be understood to mean the outer layer or boundary of a material, such as, for example, a metal, a metal alloy, a polymer, a composite polymer, concrete and the like.

In the specification, the term "sufficient quantity" should be understood to mean a quantity of at least 0.1 mg/mL of the composition sufficient to affect the structural integrity of a biofilm following mixing and incubating the composition and biofilm for a period of time, such as, for example, 24 to 72 hours.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Materials and Methods

Materials

Figure 1:
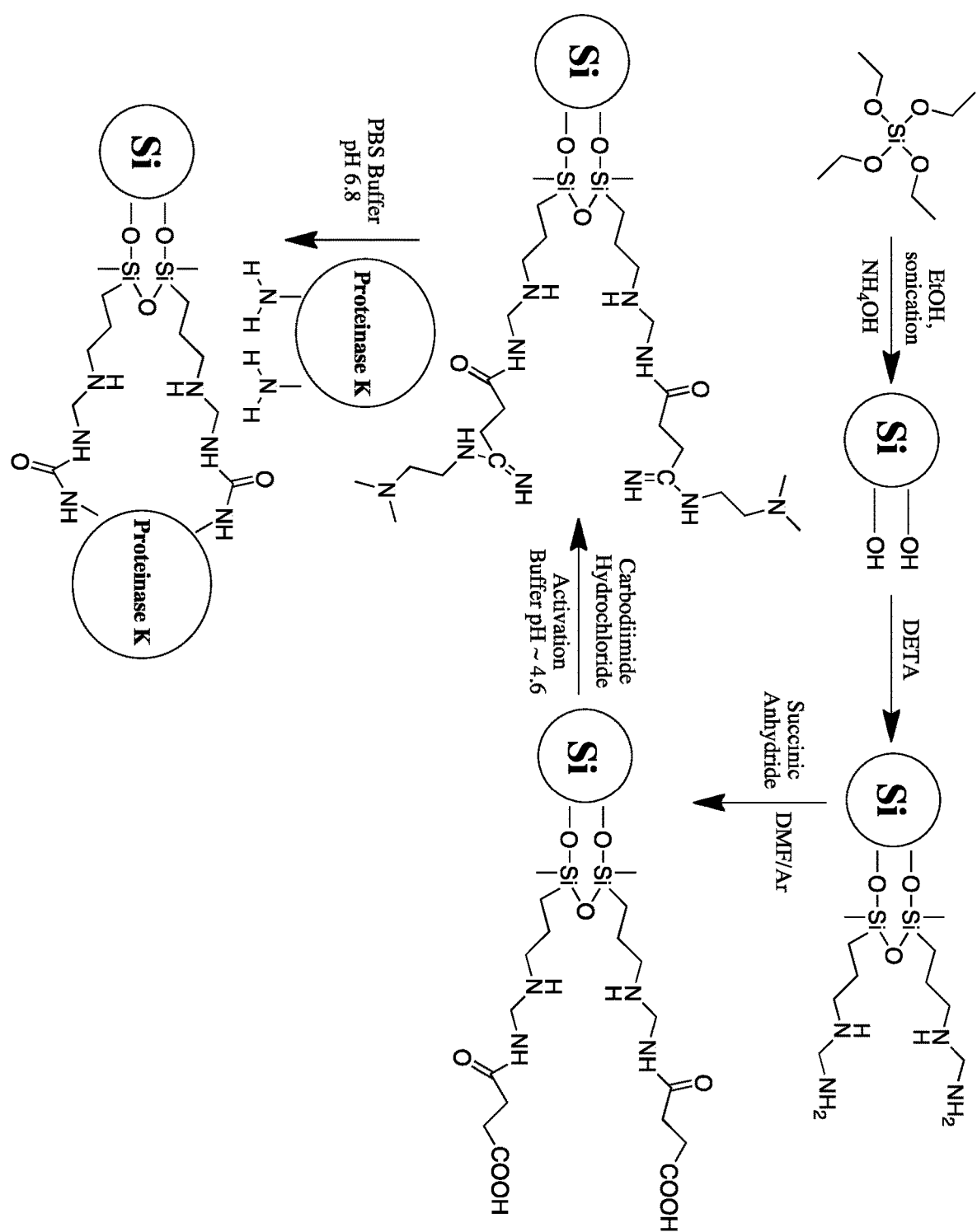
FIG. 1 is a schematized overview of the chemical preparation of enzyme functionalised silica nanobeads of the prior art (J. Coll. Int. Sc. 26, 62-69, 1968).

Water soluble 1-[3-(dimethylamino)propyl]-3-ethylcarbodiimide hydrochloride (WCA), tetraethylorthosilicate (TEOS), Trimethoxysilylpropyldiethylenetriamine (DETA, a silanization reagent) and succinic anhydride were purchased from Fluorochem Ltd (UK). All other chemicals for the buffers, culture broths and solvents were of analytical reagent grade and were purchased from Sigma Aldrich Co. LLC (Ireland). Distilled deionized water was used for the preparation of all solutions, suspensions and buffers. Confocal Microscopy glasses were purchased from Labtek®, Thermoscientific (USA). Syringe micro filters were purchased from VWR Ltd (Ireland).

Synthesis of the Functionalised Silica Nanobeads

The synthesis of the Silica Nanobeads was carried out following the Stöber process (J. Coll. Int. Sc. 26, 62-69, 1968). 500 µl of TEOS were dissolved in 15 ml of pure EtOH in an iced cooled conical flask placed in an ultrasonicator bath. The temperature was kept constant at 0° C. for the entire process. 15 ml of 14.5 M $NH_4OH$ (28-30% in $NH_3$) were slowly added to the reaction mixture during sonication and the reaction was allowed to proceed for 1 hour. When the reaction was completed, the nanobeads were centrifuged and washed thoroughly (3-4 times) with water and acetone and kept in aqueous suspension. Immediately before the functionalization step, the nanobeads were extracted and dried at 60° C. for 1 hour. The silanization of the nanobeads was obtained in 30 ml of a freshly prepared 1% v/v of DETA dissolved in 1 mM acetic acid solution for 30 minutes at room temperature. The excess of DETA was removed by rinsing and centrifuging the nanobeads with deionized water. The silanized nanobeads were transferred in a sealed conical flask and treated with 30 ml of a 10% w/v succinic anhydride solution in dry Dimethylformammide (DMF) for 6 hours under a $N_2$ atmosphere. The resulting carboxylated beads were extracted from the DMF solution and thoroughly rinsed with deionised water.

Enzyme Doped Silica Nanobeads

The surface activation of the nanobeads with WCA (Water Soluble Carbodiimide) was completed following the Bangs Laboratory protocol (Bangs Laboratories Inc., 9025 Technology Drive Fishers, Ind. 46038-2866, USA, 1-800-387-0672.). Following this step, the nanobeads were suspended in aqueous PBS (pH 7.4) and concentrated to a 10 mg/ml suspension. Proteinase K (1 mg/ml) was added to the suspension and the mixture was allowed to react for 24 hours at 25° C. The enzyme-functionalised nanobeads were finally washed with deionised water through three centrifugation steps at 5000 rpm at room temperature before storage at 4° C. in PBS (pH 7.4). The yield of the reaction was quantified by the Proteinase K enzymatic protocol that can be found on the Sigma Aldrich website.

Characterization of the Nanobeads

Silanized Silica nanobeads and enzyme-functionalised Silica nanobeads were characterized by:

Scanning Electron Microscopy

For scanning electron microscopy (SEM) observations, Silica nanobeads suspensions of 10 mg/mL were dried on stubs at 60° C. overnight prior to gold sputtering using an Eintech K575K coater for 30 s at 30 mA. High magnification imaging of non-functionalized and functionalized Silica Nanobeads was performed under a Hitachi Quanta 3D FEG scanning electron microscope at the UCD Nano-imaging and Materials Analysis Centre.

Flow Cytometry

To further assess the structural differences between non-functionalized and functionalized Silica nanobeads, the Accuri™ C6 flow cytometer was employed to reveal the size and inner complexities between the different Silica Nanobeads used in this study. Analysis was based on light scatter signals produced from 20 mW laser illumination at 488 mn. Signals corresponding to forward angle and 90°-side scatter (FALS, SS) were accumulated. Threshold levels were empirically set (80 000 for FALS) to eliminate the detection of irrelevant debris. Templates for uni- and bi-parametric frequency distributions were established of the region corresponding to Silica Nanobeads, and the data collected to total of 50000 events. The flow cytometry routine was operated at a slow flow rate setting (0.6 µL sample/second).

FTIR Measurements

FITR measurements were obtained with a Varian 680 FTIR (Agilent Technologies Ltd) instrument. The samples were oven-dried at 40° C., after this they were individually casted on AFM-Grade bare Mica (Novascan Technologies, Inc.) and immediately analysed.

Preparation of the Artificial Biofilm (Protein Hydrogel)

The artificial biofilm was prepared by suspending in 100 ml of deionised water under stirring equal amounts (8 gr) of vegetable Peptone, Albumin and Agar. The pH of the suspension was adjusted to 3 with a 0.1 M HCl solution and the mixture was stirred for 30 minutes at room temperature. In order to analyse the gels with the Confocal Microscopy, aliquots of 2 ml of the mixture were placed in individual Labtek® well chambers which were then transferred into an incubator at 60° C. for 2 hours for gelification.

Quantification of the Functionalised Silica Nanobeads Activity

Prior to assays, 10 mg/ml of either non-functionalized or functionalised Silica nanobeads were suspended in a specific reaction buffer (30 mM Tris Cl, 30 mM EDTA, 10 mM $CaCl_2$ and a 0.5% aliquot of Triton-X100) previously prepared in deionised water and stored between 2° C. and 8° C.

Artificial Biofilm

Following gelification at 60° C., obtained artificial biofilms/protein hydrogels were cooled down to room temperature. Treatment assays consisted of submerging single protein hydrogels with 5 mL of either reaction buffer solution, non-functionalized Silica nanobeads (10 mg/mL) or functionalised Silica nanobeads (10 mg/mL), before incubation at 25° C. for 24, 48 and 72 hours with shaking at 75 rpm. Following each treatment period, gels were stained with 20 µl of Albumin 580 blue dye for one hour prior to confocal microscopy observations. Experiments were repeated in triplicates.

Confocal Microscopy

Horizontal plane images of the biofilms were acquired using an Olympus FV1000 confocal laser-scanning microscope (CLSM) at the Live Cell Imaging core technology facility platform, Conway Institute, UCD. At least 2 to 3 random areas were acquired for each and treated artificial hydrogel and biofilm per experiment. The excitation wavelength used for detecting Albumin 580 blue or mCherry was 559 nm, and emitted fluorescence was recorded within the range of 570 to 670 nm. Images were collected through an Olympus UPL SAPO 10x/0.40 Air objective with a z-step of 1 µm. 3D projections were performed with Zeiss ZEN imaging software. The structural quantification of biofilms (biovolume, surface coverage, thickness and roughness) was performed using the PHLIP Matlab program developed by J. Xavier (http: //phlip.sourceforge.net/phlip-ml).

Recovering of the Functionalised Silica Nanobeads

Non-functionalized and functionalised Silica nanobeads were collected following every single treatment assay. Collection of Silica nanobeads was also performed following biofilm-rinsing steps. Silica nanobeads were recovered by filtering colloidal suspension through 0.2 µm syringe filters, which were separately rinsed and cleaned using deionized water through several centrifugation-washing steps. Recovered Silica nanobeads were stored in PBS (pH 7.4) at 2-8° C.

Results

Synthesis of Enzyme Functionalised Silica Nanobeads

The freshly prepared silica nanobeads were synthesized following a general method already available from the literature (J. Coll. Int. Sc. 26, 62-69, 1968). Once synthesized, silica nanobeads were functionalised with Proteinase K, selected for its broad range of activity against various biomolecules in environmental conditions, as well as for its ease of functionalisation on the surface of the Silica nanobeads. These surfaces can easily be modified with different reagents in mild conditions for a high variety of applications. The major modification mechanisms used in this work is presented in FIG. 1. This procedure is based on the creation of primary amine functional groups onto the bead silica surface, which are then treated with succinic anhydride. In order to host covalent bonds with proteinase K, nanobeads were carboxylated, prior to enzyme immobilization. Proteinase K immobilization to nanobeads was performed by first incubating the beads in PBS (pH 6.8) for 24 hrs at 25° C.

under stirring, according to the procedure reported by Bangs Laboratories (TechNote 205). The functionalisation reaction yield was calculated to be 94%, as monitored by the Proteinase K assay (Sigma Aldrich, Ireland, http://www.sigmaaldrich.com/technical-documents/protocols/biology/enzymatic-assay-of-proteinase-k1-hemoglobin-substrate.html).

Characterization of the Nanobeads

Figure 2:
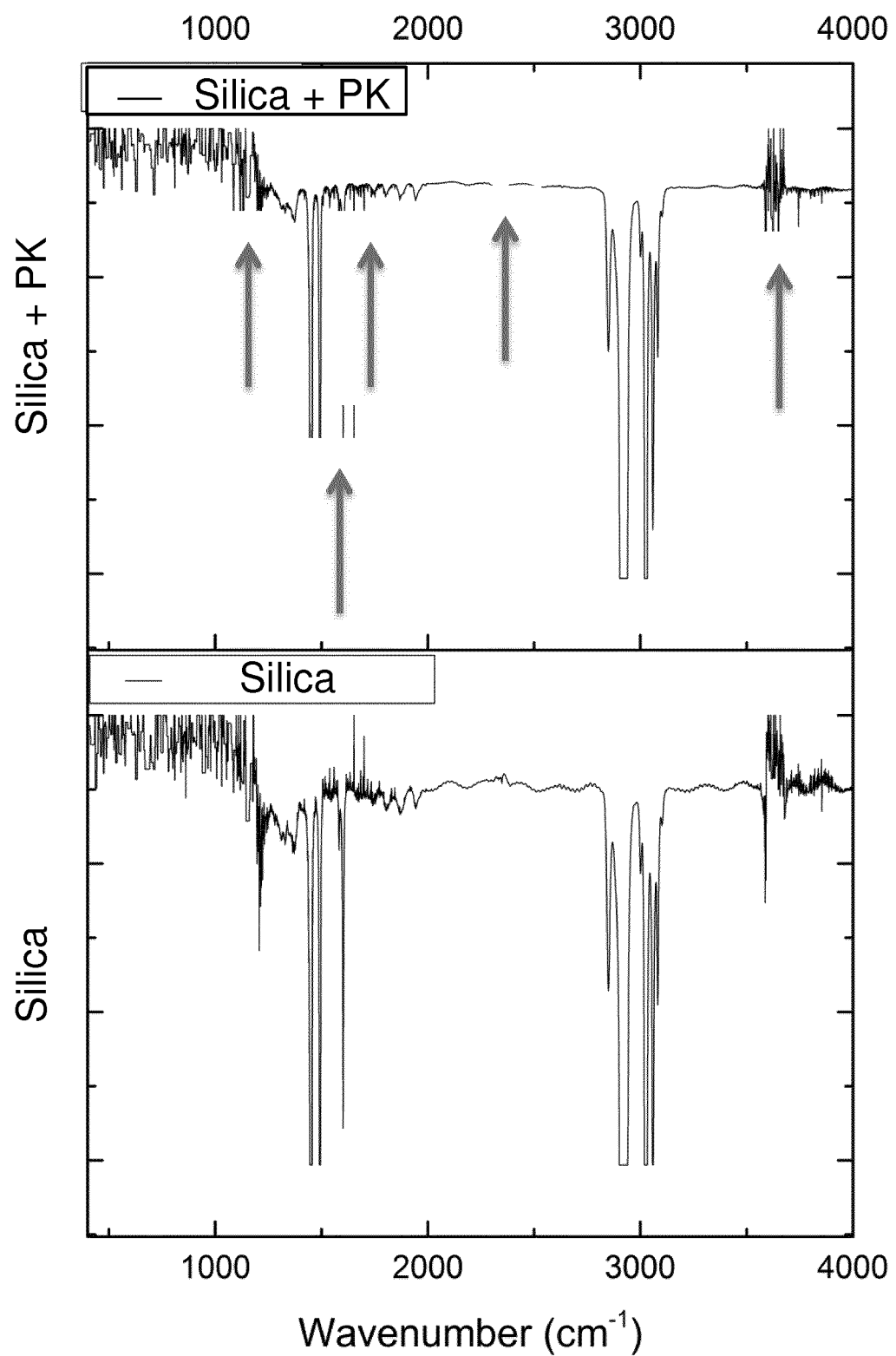
FIG. 2 is a FTIR spectra of functionalised (Silica+PK) and non-functionalised (Si-NanoB). Spectra differences between functionalised and non-functionalised Si-NanoB are shown in red.

FTIR:

FTIR-spectroscopy was employed as a means to assess and verify the successful immobilization and presence of proteinase K on functionalised Silica nanobeads (Si-NanoB). Acquired FTIR spectra were compared with spectra of non-functionalised Si-NanoB (FIG. 2). Spectral differences between functionalised and non-functionalised Si-NanoB were noticeable, clearly indicating the presence of the enzyme on the surface of the materials studied. For reference, the main spectra assignments are presented in Table 1, in which the most important identified functional units, indicating the presence of immobilized enzyme, are highlighted in bold.

TABLE 1

FTIR assignments of the analysis of the functionalised Si-NanoB.

| IR | Assignments |
|---|---|
| 790 | Si—O (asymm) |
| 1090 | Si—O |
| 1000-1300 | C—O |
| 1200 | C—H (alkyl) |
| 1500-1700 | C=O |
| 2200 | C—N |
| 2400 | N—H |
| 3000 | N—H, O—H |

SEM Imaging:

To qualitatively assess the morphological state of silica nanobeads, two samples of the freshly synthesised batch of Silica nanobeads were prepared for the analysis with scanning electron microscopy (SEM). Two samples each containing 100 mg of either non-functionalised or proteinase K functionalised Si-NanoB were prepared according to the previously reported procedure.

Figure 3:
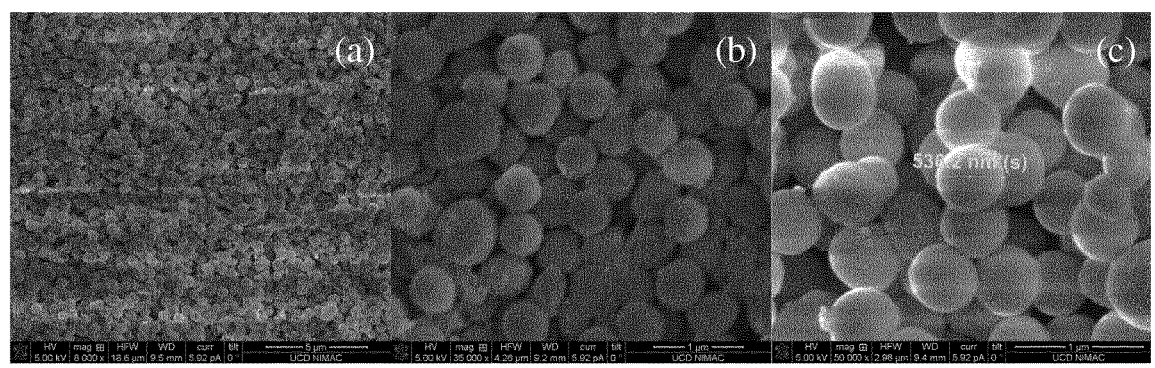
FIG. 3 illustrates representative SEM micrographs of Proteinase K functionalised Nanobeads (a-b) and Non-functionalised Si-NanoB (c).

From SEM micrographs, non-functionalised Si-NanoB (FIG. 3 (c)) appeared relatively smooth and presented a well-defined and characteristic spherical shape. The calculated average size of these beads was ~500 nm, which is 5 times larger than expected (~100 nm, according to Qhobosheane et al. *Analyst* 2001, 126 (8), 1274-1278.).

SEM images of proteinase K functionalised Si-NanoB (FIGS. 3 (a) and (b)) were rougher and less uniform than the previous Proteinase K-free nanobeads (FIG. 3(c)). Since the presence or absence of proteinase K on the surface of Si-nanobeads is the determining difference, the likelihood of the observed surface disparities between tested samples can be ascribed by the physical presence of the proteinase K enzymes on the external area of the nanobeads. Moreover, functionalisation of Si-NanoB with Proteinase K resulted in an increased diameter of on average 20 nm, hence further proving the presence of the desired immobilized protein.

Protein-Based Hydrogel: Artificial Biofilm

Synthesis and optimization of the artificial biofilm: designing a model synthesized artificial biofilm was found to be an essential testing ground to assess the specific enzymatic activity of proteinase K-functionalised Si-Nano beads in controlled experimental digestion conditions.

Figure 4:
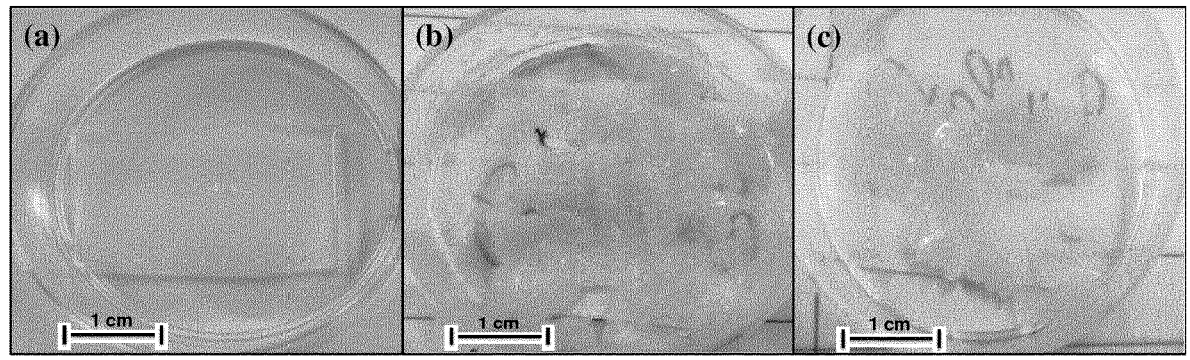
FIG. 4 illustrates thermally prepared protein-based hydrogels drop-casted onto microscope glass slides. (a) Albumin-Peptone hydrogel. This gel presents a very smooth and uniform surface: it is easy to mould (in this case it was drop-casted on a microscope glass), the jellification process is quick and the surface looks smooth and easy to analyse. (b) Albumin-Agar-Peptone hydrogel. This formulation presented a very rough and brittle structure and it is very difficult to manipulate; (c) Albumin-Agar hydrogel. The gel was prepared in different thermal conditions due to the presence of Agar. This gel is very brittle and difficult to handle.

Three gels were individually prepared following a method found in a previously reported procedure (*Appl. Microbiol. Biotechnol.*, 2000, 54: 231-237), with minor modifications: the gels were composed of a cocktail of different proteins (albumin and soy proteins above all) and polysaccharides (Agar among them) to reproduce the roughness of a typical biofilm. Artificial biofilms were prepared in an aqueous medium used for gelification, adjusted to pH 3 using 0.1M HCl. Since biofilms are complex systems, the use of standardized model matrixes was found to be very useful in assessing the specific role and activity of non-functionalised nanobeads and proteinase K functionalised Si-nanobeads respectively (i.e. mechanical action or enzymatic activity). The final formulation (FIG. 4 (a)) was chosen because of its adaptability and reproducibility closely matching the chemical composition of a typical bacteria-based biofilm. Furthermore, the ease of preparation, the capacity to mold the gels structure and the availability of the ingredients used in preparation of the gel, allowed a reliable and fast production of the different substrates for each analysis.

Figure 5:
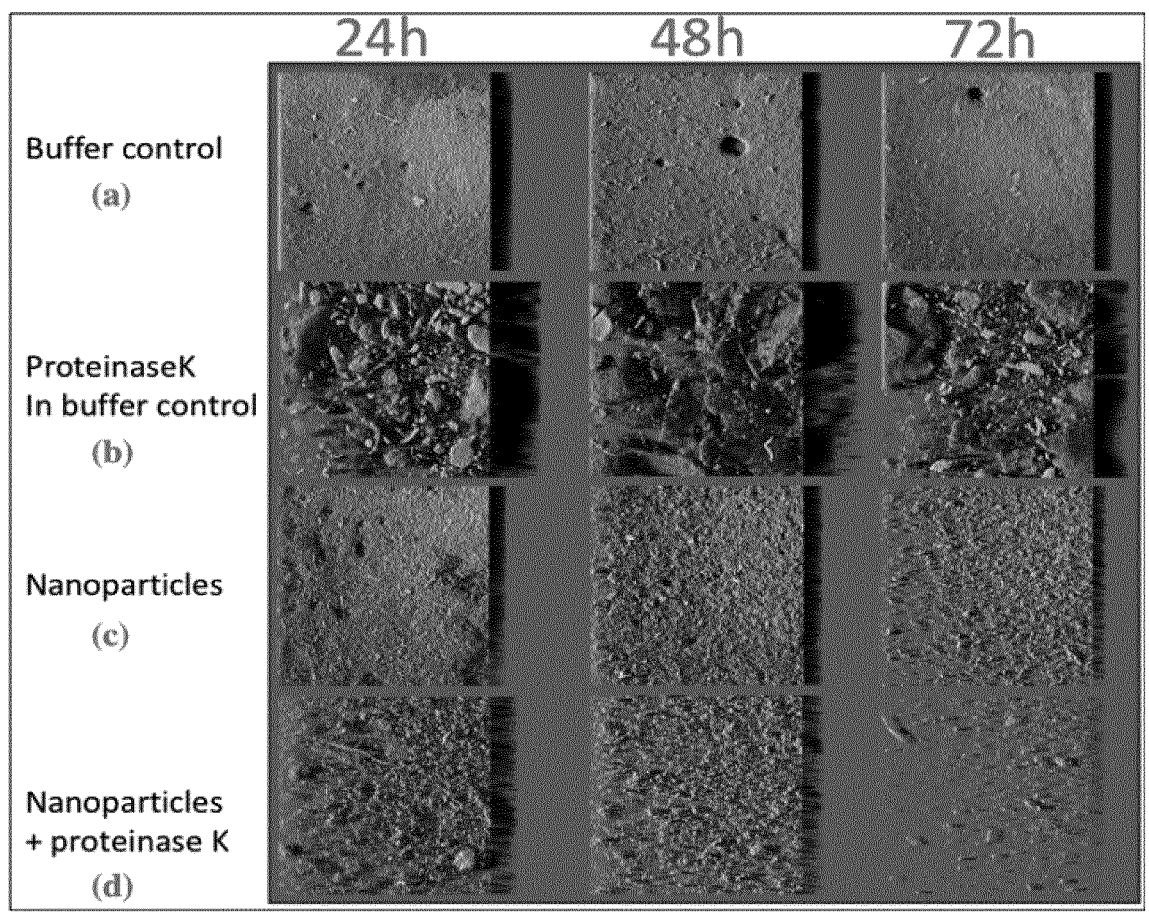
FIG. 5 illustrates representative confocal micrographs of protein-based hydrogels treated for 24, 48 and 72 hours with buffer control solution (a), proteinase K buffer control (b), non-functionalised Si-NanoB (c), and Proteinase K-functionalised Si-NanoB (d).

Protein-Based Hydrogel Removal Analysis after 24, 48 and 72 Hrs: Confocal Analysis To assess the removal activity of functionalised and non-functionalised Si-nanobeads on protein-based hydrogels following 24, 48, and 72 hour treatments (FIG. 5), treated gels were analysed using confocal microscopy and compared to gels treated in either buffer (control a) or in a solution of proteinase K (control b). Compared to the buffer controls a & b, the nanobead treatments led to structural changes to the artificial biofilm, as observed by the gel's structural parameter after 72 h shaking. This shows that the gel underwent structural damage by the presence of Si-nanobeads. The enzymatic treatment (control b) successfully damaged the gel's structure; however to a lesser degree compared to the combined effect of proteinase K-functionalised nanobeads (d), as observed by the level of gel disintegration. Moreover enzyme treatment was not able to properly disintegrate the gel over the course of the 72-hour treatment. This proves that the combination of both nanobeads and enzymes is ideal to entirely disintegrate the gel structure.

Figure 6:
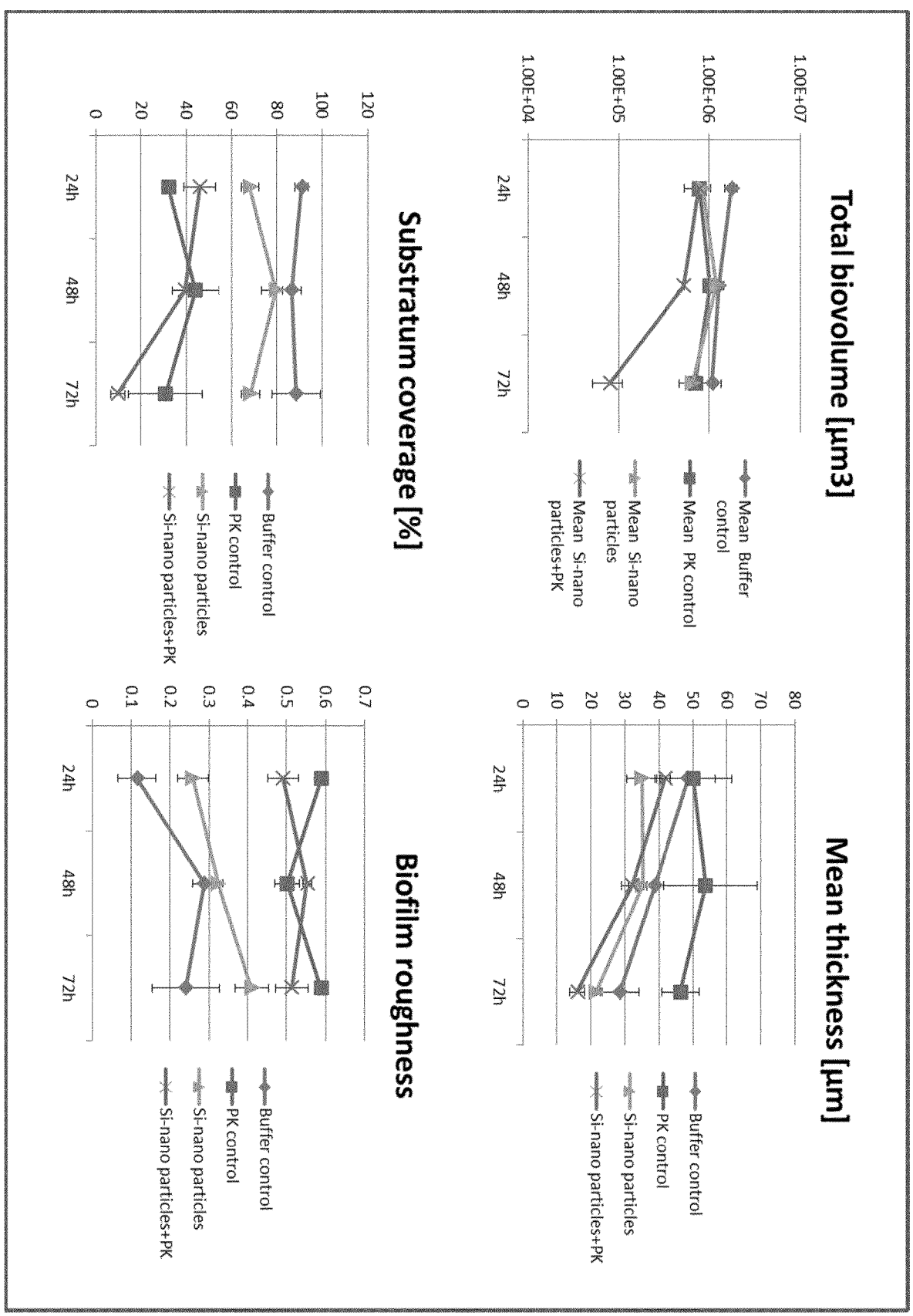
FIG. 6 illustrates the structural properties of protein-based hydrogels following 24, 48 and 72 hours treatment with buffer control, Proteinase K buffer control, non-functionalised Si-NanoB, or Proteinase K-functionalised Si-NanoB. Structural hydrogel properties were obtained following PHLIP analysis and are presented in terms of Biovolume, substratum coverage, mean thickness and roughness.

The degree of gel disintegration operated by Si-NanoB was quantitatively analysed using acquired confocal images with PHLIP (cf. Material and Methods section). This led to the quantification of treated gels in terms of biovolume ($\mu m^3$), mean thickness ($\mu m$), surface coverage (%) and Roughness (FIG. 6). The effects of Proteinase K-functionalised Si-NanoB, on protein-based hydrogel over the course of the 72 hour treatment was clearly observed by the significant reduction in biovolume, surface coverage and thickness of the hydrogel compared to hydrogels treated with control solutions. However, treatment with non-functionalised Si-NanoB showed to have mechanically etched the hydrogel structure over time, as observed by the gels decreased mean thickness and increased roughness properties following 72 hours treatment.

Interestingly, hydrogels treated with Proteinase K buffered solution do not present the same degree of structural change, compared to exposure to proteinase K-functionalised Si-NanoB, as observed by unaltered biovolume over the course of the treatment. This clearly shows the limited action of the enzyme, which has to slowly diffuse through the hydrogel in order to react with the proteins within the gel. In contrast, proteinase K-functionalised Si-NanoB not only incurred structural damage to the hydrogel, but through the increased reactive surface area, was capable of digesting larger portions of the gel. This observed double-action of functionalised Si-NanoB was found to be the ideal combination to successfully remove and digest hydrogels.

Activity of Recycled Nanobeads after 24 and 48 Hrs

To assess the reusability of Silica Nanobeads, standardized protein-based hydrogels were treated with either freshly prepared (i.e. unused) Si-NanoB or recycled Si-NanoB (cf. Material and Methods) for 24 and 48 hours. As control treatments, hydrogels were exposed to either a buffer or Proteinase K buffer solutions for the same treatment period. Confocal microscopy analyses were performed following treatments, allowing qualitative assessments of the treatment effects on hydrogels (FIG. 7(a-f)).

Figure 7:
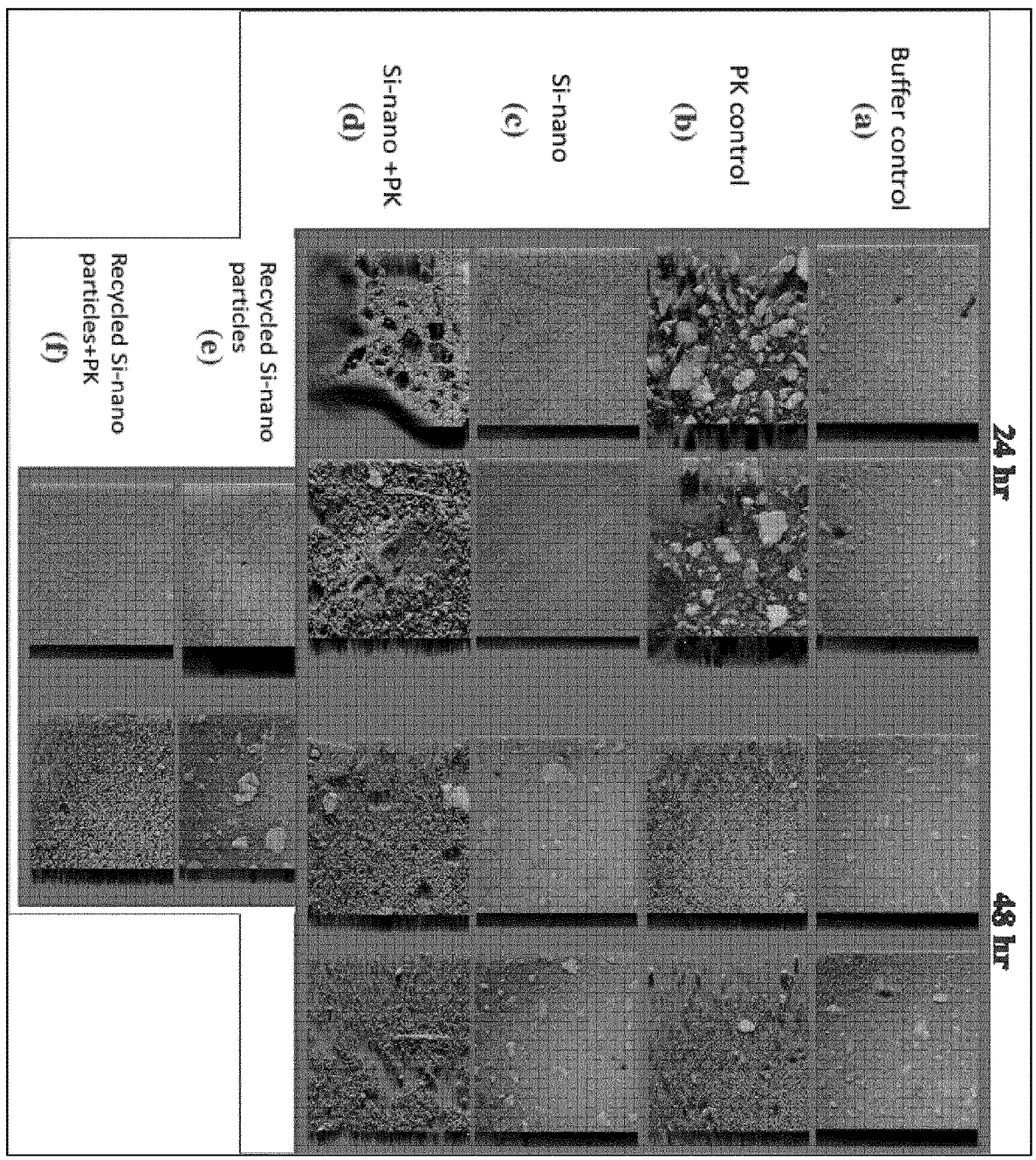
FIG. 7 illustrates representative confocal micrographs of protein-based hydrogels treated for 24 and 48 hours with buffer control solution (a), proteinase K buffer control (b), non-functionalised Si-NanoB (c), and Proteinase K functionalised Si-NanoB (d), Recycled non-functionalised Si-NanoB (e), and recycled proteinase K-functionalised Si-NanoB.

Compared to fresh Silica nanobeads, recycled nanobeads generally showed reduced mechanical or enzymatic activities on hydrogels (FIG. 7). Nevertheless, over the course of the 48 hour treatment, increased gel disintegration were observed for recycled Silica nanobeads, hence suggesting that recycled nanobeads still possess mechanical and enzymatic properties, albeit their impeded reaction time. Although the nanobeads were washed during the recycling steps, it is very likely that some remnant materials from previously treated gels may have possibly covered the Silica-nanobeads. Nevertheless, obtained results clearly show that recycled Silica Nanobeads still possess some degree of mechanical or enzymatic activity on hydrogels. Optimising the activity of recycled nanobeads for subsequent treatment used, should therefore focus on developing efficient recovery and cleaning protocols that will preserve their functional properties.

The advantages of the nanobeads of the claimed in invention is that they provide benefits other than just a substratum for enzyme immobilisation. Because of their size and physical properties, they provide a mechanical (abrasion) effect on the fouled surface. The hydrophobic surface properties reduce the amount of residual portions of biofilm that may remain attached on them after the removal reaction, thus favouring their cleaning and their recovery. Their density (compared to water) eases their recovery through filtration systems from aqueous solutions.

The key feature for the mechanical/abrasive effect is the density difference of the bead relative to water. For silica this difference is very high. The prior art use of an aerogel, which is notable for its very low density relative to water as they are highly porous, would not be expected to have any "mechanical" anti-fouling effect.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A recyclable composition for use in treating a fouling layer present on a material surface, the composition comprising a surface-functionalised, silica-based nanobead, wherein the surface is functionalised by a first moiety, the first moiety being an active enzyme selected from Proteinase K, an aldehyde oxidoreductase, a monooxygenase, bile salt-dependent lipase, phospholipase A, phospholipase C, and a DNAse.

2. A recyclable composition according to claim 1, wherein the silica-based nanobead has an active enzyme coating with a specific reactivity to the fouling layer.

3. A recyclable composition according to claim 1, wherein the silica-based nanobead is comprised of silicon and an organic-based linker composed by carbon, oxygen and nitrogen.

4. A recyclable composition according to claim 1, wherein the silica-based nanobead is further functionalized with a second moiety, the second moiety being an active enzyme.

5. A recyclable composition according to claim 1, wherein the active enzyme is Proteinase K.

6. A recyclable composition according to claim 1, wherein the silica-based nanobead includes silicon and an organic-based linker containing carbon, oxygen, and nitrogen.

7. A recyclable composition according to claim 6, wherein the silica-based nanobead consists of silicon, carbon, oxygen, and nitrogen.

8. A recyclable composition according to claim 1, wherein the silica-based nanobead is spherical or substantially spherical.

9. A recyclable composition according to claim 1, wherein the composition is water-soluble.

10. A method for removing a fouling layer present on a material surface, the method comprising the steps of:
adding a sufficient quantity of a silica-based nanobead composition comprising the surface-functionalised, silica-based nanobead of claim 1 to the material surface;
incubating the silica-based nanobead composition and fouling layer on the material surface for a sufficient period of time for the composition and fouling layer present on the material surface to interact for treatment; and
separating and removing the silica-based nanobead composition from the treated fouling layer on the material surface following the incubation step.

11. A method according to claim 10, wherein the separation step is selected from filtration, centrifugation, electrostatic separation and gravimetric precipitation.

12. A method according to claim 10, wherein the incubation step is performed for between 2 hours to 72 hours.

13. A method according to claim 10, wherein the silica-based nanobead composition is recycled following the separation step for use in the addition and incubation steps.

14. A method according to claim 10, wherein the silica-based nanobead composition is recycled following the separation step for use in the addition and incubation steps, and wherein the recycled silica-based nanobead composition is reintroduced to the addition step.

15. A kit for removing a fouling layer from a material surface, the kit comprising a recyclable composition comprising a surface-functionalised, silica-based nanobead, wherein the surface is functionalised by a moiety, the moiety being an active enzyme selected from Proteinase K, an aldehyde oxidoreductase, a monooxygenase, bile salt-dependent lipase, phospholipase A, phospholipase C, and a DNAse.

* * * * *